United States Patent [19]

Dåstøl

[11] Patent Number: 5,843,216

[45] Date of Patent: Dec. 1, 1998

[54] CONCRETE ADDITIVE COMPRISING A MULTICOMPONENT ADMIXTURE CONTAINING SILICA FUME, ITS METHOD OF MANUFACTURE AND CONCRETE PRODUCED THEREWITH

[75] Inventor: Magne Dåstøl, Kristiansand, Norway

[73] Assignee: Elkem Materials Inc., Pittsburgh, Pa.

[21] Appl. No.: 630,314

[22] Filed: Dec. 19, 1990

Related U.S. Application Data

[62] Division of Ser. No. 227,801, Aug. 3, 1988, abandoned, which is a continuation of Ser. No. 51,156, May 13, 1987, abandoned, which is a continuation of Ser. No. 693,851, Jan. 23, 1985, abandoned, which is a continuation-in-part of Ser. No. 447,871, Dec. 8, 1982, abandoned.

[30] Foreign Application Priority Data

Dec. 7, 1982 [NO] Norway .................................. 82.4100

[51] Int. Cl.$^6$ .................................................. C04B 14/04
[52] U.S. Cl. ......................... 106/819; 106/491; 423/335
[58] Field of Search ................................... 106/819, 491; 423/335

[56] References Cited

U.S. PATENT DOCUMENTS

| | | | |
|---|---|---|---|
| 2,410,954 | 11/1946 | Sharp | 106/98 |
| 3,135,617 | 6/1964 | Newell et al. | 106/98 |
| 3,880,664 | 4/1975 | Schulze | 106/99 |
| 3,969,567 | 7/1976 | Occleshaw | 428/297 |
| 4,118,242 | 10/1978 | Kjohl et al. | 106/98 |
| 4,297,309 | 10/1981 | North | 264/56 |
| 4,310,486 | 1/1982 | Cornwell et al. | 264/309 |
| 4,384,896 | 5/1983 | Aitcin et al. | 106/288 B |
| 4,501,830 | 2/1985 | Miller et al. | 106/98 |

FOREIGN PATENT DOCUMENTS

| | | | |
|---|---|---|---|
| 8000959 | 5/1980 | European Pat. Off. | 106/98 |
| 8202709 | 8/1982 | European Pat. Off. | |

*Primary Examiner*—Melissa Bonner
*Attorney, Agent, or Firm*—Bierman, Muserlian and Lucas

[57] ABSTRACT

A multicomponent aqueous flowable admixture is formed with silica fume and stabilized with one or more high-range concrete water-reducing agents or one or more ordinary concrete water-reducing agents alone or in combination. The admixture is of particular advantage when added to fresh concrete or mortar to enhance plasticity and workability as compared to conventional concrete or mortar.

3 Claims, No Drawings

CONCRETE ADDITIVE COMPRISING A MULTICOMPONENT ADMIXTURE CONTAINING SILICA FUME, ITS METHOD OF MANUFACTURE AND CONCRETE PRODUCED THEREWITH

This is a divisional of application Ser. No. 227,801 filed Aug. 3, 1988, now abandoned which, in turn, was a continuation of application Ser. No. 051,156 filed May 13, 1987, now abandoned which, in turn, was a continuation of application Ser. No. 693,851 filed Jan. 23, 1985, now abandoned which, in turn was a continuation-in-part of application Ser. No. 447,871 filed Dec. 8, 1982, now abandoned.

The present invention relates to an additive for concrete which comprises a multicomponent aqueous admixture that contains silica fume and at least one concrete water-reducing agent or at least one high-range concrete water-reducing agent. Advantageously, the admixture may contain one or more water-reducing agents in combination with one or more high-range water-reducing agents along with the silica fume. Accelerators and retarders alone or in combination may also be used in the admixture as optional ingredients.

In accordance with the present invention, an aqueous slurry of silica fume and at least one concrete water-reducing agent with or without additional optional ingredients are premixed and the resulting flowable admixture is added and mixed into the concrete batch at any desired stage. The premixing in aqueous slurry is of great advantage as compared to the conventional practice of adding dry silica fume to the concrete batch in that the action of the water-reducing agent during premixing tends to uniformly coat and homogeneously disperse the silica fume particles in the aqueous flowable liquid slurry with resulting breakdown of flocs of material. The flocs of silica fume that tend to form when dry silica fume is added in conventional practice can be a serious drawback to the desirable uniform strength and durability of the cast concrete. Once flocs are formed in the concrete batch, it requires prolonged mixing to disperse the flocs and over mixing may be deleterious to the workability and formability of the batch.

While the mechanism of aqueous slurry premixing is not completely understood, it is believed to provide a synergistic effect as evidenced by the conventional slump test of a fresh concrete batch.

The concrete water-reducing agents and the optional accelerators and retarders of the present invention are well-known conventional materials currently used in high strength concrete which may have a compressive strength of up to about 6,000 to 12,000 pounds per square inch.

One of the most significant developments in concrete since air-entrained concrete was developed in the mid-1930's is the use of so-called water-reducing agents.

Concrete water-reducing agents are chemical compounds which, when added to concrete, fluidize the concrete for a period of time so that (1) normal workability can be obtained in concrete having much lower water-cement ratios than would normally be employed or (2) extremely workable "flowing concrete" (that is essentially self-leveling without undesirable side effects, such as aggregation, low durability, low abrasion resistance, and bleeding) can be obtained, or (3) a combination of (1) and (2). A reduction in the water to cement ratio usually results in increased strength of concrete everything else being equal.

Water-reducing agents are well-known additives for concrete. The commercial materials in most general use fall into the following classes of materials:

1. Lignosulfonic acid and their salts and modifications and derivatives thereof,
2. Melamine derivatives,
3. Naphthalene derivatives.

In commerce, the melamines (2) and naphthalenes (3) are classified as high-range water-reducing agents. The lignosulfonic acids are usually characterized as concrete water-reducing agents.

In addition to the foregoing concrete water-reducing agents and concrete high-range water-reducing agents, there are many other chemicals known to have a water-reducing effect on cementitious materials which are in commercial use such as hydroxylated carboxylic acids and their salts. Any concrete water-reducing agent, concrete high-range water-reducing agents and chemicals conventionally used in concrete which have a water-reducing effect on cementitious materials may be used in accordance with the present invention.

The term concrete water-reducing agent and water-reducer used in the specification and claims means one or more concrete water-reducing agents and concrete high-range water-reducing agents and chemicals that have a water-reducing effect on cementitious materials conventionally used for a water-reducing effect in cementitious materials.

There are at least twelve widely used high-range water-reducing agents, eight of which belong to the above categories (2) and (3). A preferred material in category (2) is a conventional sulfonated condensate of melamine and formaldehyde sold under the brand name of "Melment" and the preferred material in category (3) is a sulfonated condensate of naphthalene and formaldehyde as, for example, sold under the brand name of "Mighty".

The best results in workability, formability and strength are achieved by using the high-range water-reducing agents in accordance with the present invention.

Concrete containing high-range water-reducing agents is extensively used in cast-in-place concrete work where extreme flowing characteristics are required such as in areas of high density of reinforcement, pumping, and in complicated form work. Among the advantages of the use of high-range water-reducing agents in pre-cast and ready-mix concrete are (a) increased strength at all ages, (b) increased bonding to reinforced steel, (c) improved workability and formability, and (d) reduced permeability to water penetration.

When a high-range water-reducing agent is added to a concrete mix, the plasticizing effects last for approximately 30–60 minutes, depending on the job conditions. Consequently it should be added at the job site when used in ready-mixed concrete.

Concrete with one or more high-range water-reducers therein are set out in "Super Plasticized Concrete", ACI Journal, May 1977, pp. N6–N11 inclusive, and the references set out therein.

It has been found that the premixed aqueous admixture of silica fume coated with one or more concrete water-reducing agents, preferably a high-range water-reducing agent used alone or in combination when added to mortar and concrete increase the density and impermeability of that mortar and concrete by several orders of magnitude. Indeed, it has been learned that non-air entrained concrete produced with the silica fume admixture of the present invention is virtually impermeable to the ingress of freezable water and aggressive fluids.

The silica fume of the present invention is an amorphous silica by-product of the manufacture of ferro-silicon and also silicon metals produced by capturing the finely divided particles from stack gases of electric arc furnaces. Silica fume is a pozzolan, i.e., it combines with lime and moisture at ordinary temperature to form compounds having cementitious properties. The main constituent is silicon dioxide ($SiO_2$) and it is usually present in at least about 60% but best results are achieved in the present invention when the $SiO_2$ content is at least about 85% by weight.

An amorphous silica fume that is eminently suitable for use in the present invention is obtained as a by-product in the production of silicon metal or ferrosilicon in electric reduction furnaces. In these processes, fairly large quantities of silica are formed as dust which is recovered in filters or other collection apparatus. Such silica fume can be obtained from Elkem a/s, Norway.

The analyses and physical data for typical samples of silica fume of this description are given in the following tables:

TABLE 1

Dust collected in bag filter from production of Si-Metal:

| Component | % by Weight |
| --- | --- |
| $SiO_2$ | 94–98 |
| SiC | 0.2–0.7 |
| $Fe_2O_3$ | 0.05–0.15 |
| $TiO_2$ | 0.01–0.02 |
| $Al_2O_3$ | 0.1–0.3 |
| Mgo | 0.2–0.8 |
| CaO | 0.1–0.3 |
| $Na_2O$ | 0.3–0.5 |
| $K_2O$ | 0.2–0.6 |
| Mn | 0.003–0.01 |
| Cu | 0.002–0.005 |
| Zn | 0.005–0.01 |
| Ni | 0.001–0.002 |
| S | 0.1–0.3 |
| C | 0.2–1.0 |
| P | 0.03–0.06 |
| Ignition loss (1000° C.) | 0.8–1.5 |
| Bulk density, from bunker, g/l | 200–300 |
| Bulk density, compacted, g/l | 500–700 |
| Real density, g/cm$^3$ | 2.20–2.25 |
| Specific surface, m$^2$/g | 18–22 |
| Primary particle size, percentage < 1 um | 90 |

TABLE 2

Dust collected in bag filter from production of 75% FeSi:

| Component | % by Weight |
| --- | --- |
| $SiO_2$ | 86–90 |
| SiC | 0.1–0.4 |
| $Fe_2O_3$ | 0.3–0.9 |
| $TiO_2$ | 0.02–0.06 |
| $Al_2O_3$ | 2.5–3.5 |
| MgO | 0.2–0.5 |
| $Na_2O$ | 0.9–1.8 |
| $K_2O$ | 2.5–3.5 |
| Mn | — |
| Cu | — |
| Zn | — |
| Ni | — |
| S | 0.2–0.4 |
| C | 0.8–2.0 |
| P | 0.03–0.08 |
| Ignition loss (1000° C.) | 2.4–4.0 |
| Bulk density, from bunker, g/l | 200–300 |
| Bulk density, compacted, g/l | 500–700 |
| Real density, g/cm$^3$ | 2.20–2.25 |
| Specific surface, m$^2$/g | 18–22 |
| Primary particle size, percentage < 1 um | 90 |

Amorphous silica fume of the above type can be obtained from other manufacturers of Si and FeSi, for example, the manufacture of silicon involves the reduction of silica (coarse, silica, e.g. quartz) with carbon. Iron is added if the alloy ferrosilicon is to be manufactured. Part of the product of this reduction of silica may be re-oxidized in the vapor phase (e.g. in air) to form the fine, particulate silica fume that is useful herein. While the dust collected from an electric furnace producing ferrosilicon containing at least 75% silicon is preferred, the dust collected from an electric furnace used to produce 50% ferrosilicon may also be used in accordance with the present invention.

It is possible to obtain the amorphous silica fume not as a by-product but as the major product, by appropriately adjusting the reaction conditions. Amorphous silica fume of this type may also be produced synthetically without reduction and re-oxidation.

The amorphous silica used in the present invention is composed substantially of sub-micron, spherical particles. The spherical shape together with its fineness pozzolanic activity makes it surprisingly useful in accordance with the present invention.

For example, the amorphous silica fume particles may consist of at least 60 to 90% by weight of $SiO_2$, will have a real density of 2.20–2.25 g/cm$^3$ and will have a specific surface area of 18–22 m$^2$/g, the particles being substantially spherical, and wherein at least 90% by weight of the primary particles have a particle size of less than 1 micron. Of course, variation of these values is readily possible. For example, the silica fume may have a lower $SiO_2$ content. Moreover, the particle size distribution can be adjusted; thus, it is possible to remove coarser particles, by classification.

The amorphous silica fume may be dark gray in color owing to a content of carbon. However, this carbon can be burnt off, e.g. at temperatures of about 400° C. It is also possible to modify the silicon and ferrosilicon manufacturing processes as to obtain the silica fume in a comparatively white form which is otherwise virtually identical with the gray silica normally produced. Essentially, the process modification consists of reducing the amount of coal in, or eliminating coal from, the charge. The other consequence of this modification is a change in the proportion of silica produced to the amount of silicon or ferrosilicon; in other words, the ratio of silica to silicon or ferrosilicon is higher in the modified process.

The term silica fume as used herein is intended to mean the particulate amorphous silica obtained by a process in which silica is reduced and the reduction product is oxidized in the vapor phase in air. The said term silica fume also includes the same type of amorphous silica produced synthetically without reduction and re-oxidation. Most conveniently, the silica fume of the present invention is obtained from the off-gas of silicon metal or ferrosilicon produced in electric reduction furnaces.

In order to achieve intimate contact of the silica fume particles with one or more selected ordinary water-reducing agents or high-range water-reducing agents alone or in combination, an aqueous flowable slurry is used to achieve a uniform and homogeneous dispersion of the ingredients which results in coating the particles of silica fume at least in part with the selected water-reducing agent or agents.

The aqueous slurry admixture may comprise from about 10% to about 80% by weight of silica fume and preferably from about 40% to about 60% by weight of silica fume and from about 0.5% to about 40% by weight (dry weight) of one or more high-range or ordinary concrete water-reducing agents alone or in combination and preferably from about 1.0% to about 20% by weight of said high-range or ordinary water-reducing agent alone or in combination therein, the balance being water. The aqueous slurry of the present invention will in all cases have at least about 15% by weight of water based on the weight of the dry solids.

In one example 45 pounds of silica fume, 3 pounds of commercial grade of sulfonated condensate of naphthalene formaldehyde (high-range concrete water-reducing agent) and 3 pounds of a commercial grade of cellulose ether (concrete water-reducing agent) are uniformly and homogeneously dispersed in 5.5 gallons of water preferably in a Banbury mixer. The pH of the aqueous slurry may be adjusted with conventional mineral acid or alkali to between about 3.0 to about 7.5 and preferably between about 5.0 to about 6.0 in order to obtain a slurry of proper liquid consistency for pumping, transportation and mixing into the concrete batch. Water is the most economical liquid to use in forming the admixture slurry of the present invention but, if desired, an organic liquid may be employed provided that it is compatible with the concrete and is not otherwise deleterious.

Yield point which is a measure of gel strength and relative viscosity of aqueous slurry admixtures of the present invention was recorded using a Haake viscometer utilizing an E-30 sensor and the standard procedure described by the manufacturer and compared to a blank aqueous slurry containing the same amount of silica fume without any water-reducing agent. In each sample the slurry contained 65% by weight of silica fume for comparison.

In accordance with the procedure specified by the manufacturer, silica fume and water were mixed for approximately two minutes in a Waring blender. If additives were used, these were added after about one minute of mixing. The mixture thus prepared was immediately poured into a 250 ml glass beaker and allowed to rest until the predetermined time for testing (e.g., one hour, seven days, 28 days). The test was performed in the same beaker without prior agitation.

Before measuring the yield point, the sensor E-30 was very carefully lowered into the beaker and submerged in the slurry. The sensor was allowed to rest for the standard time of two minutes in order for the gel adjacent to the sensor to reform. The beaker was then twisted carefully until slipping occurred between the sensor and the slurry. The maximum torque reading is reported as the yield point. The viscosity measurement was done immediately after this reading by gradually increased the speed of the sensor, using the automatic speed controller provided by the manufacturer. The E-30 sensor is a metal cylinder of 24 mm diameter and height of 50.5 mm. The following data was recorded in this tests:

| Sample | INVERSE Speed of Sensor Rotation | 1 HR. Measured Torque | 7 Days Measured Torque | 28 Days Measured Torque |
| --- | --- | --- | --- | --- |
|  | 32 | 53 | 150 | 150 |
|  | 16 | 56 | 150 | 150 |
|  | 8 | 60 | 150 | 150 |
|  | 4 | 64 | 150 | 150 |
|  | 2 | 69 | 150 | 150 |
|  | 1 | 78 | 150 | 150 |
| Yield Point Sample A |  | 49 | 150 | 150 |
| Ligno Sulfonate 2.5% by weight (Borresperse NA) 65% by weight silica fume and 32.5% by weight of water | 32 | 4 | 8 | 11 |
|  | 16 | 4 | 11 | 16 |
|  | 8 | 5 | 11 | 17 |
|  | 4 | 6 | 12 | 18 |
|  | 2 | 7 | 14 | 23 |
|  | 1 | 9 | 16 | 23 |
| Yield Point Sample B |  | 2 | 3.5 | 15 |
| Sulfonated condensate of naphthalene and formaldehyde 2.5% by weight (Mighty) 65% by weight silica fume and 32.5% by weight of water | 32 | 18 | 17 | 26 |
|  | 16 | 20 | 21 | 27 |
|  | 8 | 25 | 23 | 26 |
|  | 4 | 27 | 24 | 25 |
|  | 2 | 32 | 28 | 27 |
|  | 1 | 39 | 34 | 33 |
| Yield Point Sample C |  | 28 | 28 | 43 |
| Sulfonated condensate of melamine and formaldehyde 2.5% by weight (Rescon HP) 65% by weight silica fume and 32.5% by weight of water | 32 | 21 | 57 | 55 |
|  | 16 | 32 | 63 | 61 |
|  | 8 | 33 | 68 | 64 |
|  | 4 | 36 | 74 | 69 |
|  | 2 | 42 | 81 | 76 |
|  | 1 | 49 | 91 | 88 |
| Yield Point |  | 32 | 63 | 72 |

The yield point in the foregoing data is a measure of the internal strength of gel structure that forms in the aqueous slurry standing at rest at ordinary room temperature. As is known, silica fume will form a thixotropic mixture in water which frequently results in a gelling of the aqueous slurry. When the slurry gels to an objectionable extent it is not satisfactory since, as a practical matter, it does not flow and it is extremely difficult and virtually impossible to pump from storage. It was quite surprising and unexpected to find that the high-range water-reducing agent of Samples B and C above and the ordinary water-reducing agent of Sample A above were effective materially to reduce the tendency for the aqueous slurry to gel as is experienced with silica fume alone in aqueous slurry.

It is believed that during mixing the high-range and ordinary water-reducing agents coat the surface of the silica fume particles and thereby effectively reduce the tendency for the slurry to gel. Experience has shown that when the yield point in the above table is in the neighborhood of about 25 the aqueous slurry is excellent for use in accordance with the present invention and the aqueous slurry is entirely satisfactory for pumping and transportation up to a yield point of about 75. When the yield point of the slurry is above about 100 it becomes difficult to pump and the slurry is not satisfactory for use in accordance with the present invention.

In accordance with the present invention, aqueous slurries of silica fume are stabilized and the tendency to gel is materially reduced or eliminated by dispersing from about 0.1% to about 10.0% and preferably from about 2.0% to 5.0% of high-range or ordinary concrete water-reducing agent by weight (dry basis) based on the weight of silica fume in the aqueous slurry. In general, the amount of silica fume in the aqueous slurry will comprise from about as little as 5% and up to about 80% by weight. One or more high-range or ordinary water-reducing agents may be used alone or in combination in order to stabilize the silica fume aqueous slurry admixture against gelation. When the aqueous slurry admixture is to be used as an additive for concrete or mortar the amount of high-range or ordinary concrete water-reducing agent may exceed 10% by weight as specified hereinabove and may constitute from about 0.5% to about 40% by weight of the aqueous slurry admixture. The aqueous slurry will in any event contain at least about 15% by weight of water based on the weight of dry solids.

In commercial operations it is important that the silica fume aqueous slurry shall remain fluid without objectionable gelling during transportation, storage and use at the construction site. The selection of particular ordinary concrete water-reducing agents or high-range concrete water-reducing agents alone or in combination and the amount thereof that will provide an aqueous silica fume slurry that will be satisfactory for use in accordance with the present invention is readily determined by forming a test aqueous slurry containing from about 5.0% to about 80% by weight of silica fume and from about 0.5% to about 40% by weight of the selected ordinary and high-range concrete water-reducing agents which are homogeneously mixed, stored at ordinary room temperature and tested for yield point in standard manner as described by the manufacturer using an E-30 sensor and Haake viscometer on day seven. If the slurry has a yield point of less than about 100.0 and preferably not over 75.0 at an inverse sensor speed of about 2.0 on day seven, the selected ordinary and high-range concrete water-reducing agents alone or in combination in the selected amount are satisfactory for preventing the silica fume aqueous slurry from gelling in accordance with the present invention. The term "gel strength yield point" as used in the specification and claims shall mean the yield point of the selected silica fume aqueous slurry determined on day seven using the Haake viscometer, E-30 sensor and an inverse sensor speed of 2.0 in the conventional Haake procedure described by the manufacturer of the Haake viscometer. For best results of pumping, transportation and mixing with fresh concrete, the gel strength yield point of the aqueous silica fume water-reducer slurry is not over about 75.0. If desired, silica fume slurries made in accordance with the present invention may include additional ingredients as long as these do not increase the Haake gel strength yield point above about 100.0 as obtained by the selected one or more ordinary and high-range concrete water-reducing agents alone or in combination that are used in the slurry as specified hereinabove.

The amount of aqueous flowable admixture of the present invention to be added to conventional fresh concrete mixtures or mortar will vary depending upon the application at hand. The amount of admixture to be added is based on the weight of cement in the concrete or mortar batch.

In general, a sufficient quantity of the admixture of the present invention is added and mixed into a fresh concrete or mortar batch to provide therein from about 2.0% to about 100% and preferably from about 2% to 25% by weight of dry silica fume based on the weight of cement and from about 0.1% to about 5% by weight of high-range or ordinary concrete water-reducing agent alone or in combination based on the weight of cement in the concrete or mortar batch.

In accordance with standard industry practice, the optimum amount of the ingredients in the admixture and the amount of admixture within the specified range to be added to the concrete with the job materials at hand is determined by tests that simulate the ambient conditions and construction procedures to be encountered on the construction job. Conventional tests are employed to indicate the affect of the admixture on the concrete insofar as pertinent to the job with respect to air content of the concrete, consistency, bleeding of water and possible loss of air from fresh concrete, workability, formability, rate of hardening, compressive and flexural strength, resistance to freezing and thawing, shrinkage on drying and permissible chloride content.

The conventional addition of high-range and ordinary concrete water-reducing agents may cause the concrete batch to bleed excessively and segregate as indicated by a thin watery paste which fails to hold the coarse aggregate particles in suspension. It is also known that most high-range and ordinary water-reducing agents function by reducing the surface tension of the water component of the concrete mixture. This may result in separation of coarse aggregate particles and result in low freeze-thaw resistance, loss of pumpability, poor abrasion resistance, difficulty in the finishing operation and poor surface texture in form work.

The addition of silica fume from the flowable aqueous admixture of the present invention with its high degree of fineness increases the surface area of the solids per unit of water volume, thus achieving better separation and suspension of coarse aggregate particles and results in increased plasticity and workability through change in particle interference. Since the mixture of cement, water and admixture of the invention contains more solids per unit volume, the paste is less watery and less inclined to separate. Bleeding is thereby reduced by the silica fume holding the water in paste. This results in a homogeneous, highly-workable, pumpable mixture with reduced bleeding characteristics.

It is well-known that everything else being equal, the compressive strength of set concrete increases as the water to cement ratio in a given fresh cementitious mixture decreases. The workability and formability characteristics of fresh cementitious mixtures is determined by a conventional slump test in which an open bottomed mold filled with a fresh cementitious mixture is lifted allowing the concrete to flow. The slump in inches of height is measured to determine the workability and formability of the fresh cementitious mixture.

It has been determined that the workability and formability characteristics as shown by improved slump loss performance of fresh cementitious mixes made with the aqueous silica fume, water-reducer, flowable admixture of the present invention was quite unexpectedly superior to that obtained by adding the same amount of dry silica fume and water-reducer to a given fresh cementitious mixture in accordance with prior art mixing techniques. This is of great advantage since, in accordance with the present invention, the minimum required workability and formability characteristics in fresh cementitious mixes can be maintained for extended periods of time. Loss of workability is a well-recognized problem resulting from the use of high-range water-reducing agents which may be overcome in accordance with the present invention.

The aqueous flowable admixture of the present invention is used to advantage in conventional fresh concrete mixes and is mixed into the concrete mass using the conventional techniques now employed for mixing concrete batches. For example, an aqueous slurry admixture containing 68 pounds of silica fume, 12 pounds of dry Lomar D (high-range concrete water-reducing agent, sulfonated condensate of naphthalene and formaldehyde) and 8.3 gallons of water may be added and mixed into a conventional fresh concrete batch containing 450 pounds of Portland cement Type I without any other additives. The resulting concrete mixture at a water to cement ratio of 0.35 by weight has good workability, consistency and no segregation in the fresh state. In the hardened state, the 28 day compressive strength is typically unexpectedly high and of the order of 12,000 p.s.i. and the freeze-thaw resistance is surprisingly high even in the absence of air entrainment. The concrete mixture contains 15% silica fume (dry basis) and about 2.7% of Lomar D (dry basis) based on the weight of cement in the concrete mix. The decreased permeability of the resulting mixture increases the resistance to ingress of water and aggressive chemicals with a resulting improvement in freeze-thaw characteristics compared to concrete or mortar mixtures that do not include said silica fume aqueous slurry admixture.

The aqueous flowable admixture of the present invention is premixed in optimum proportions as determined by standard industry tests to provide a single dispensing system as compared to conventional practice where three to four dispensing systems are required at the job site. Dispensing of all additives may be carried out simultaneously with the admixture of the present invention in which the ingredients are in uniform and homogeneous dispersion as compared to the conventional practice of adding the dry silica fume which presents the problem of flocculation of the particles. The aqueous admixture of the invention saves on truck loading time and reduces error in that only one batch addition is required rather than three or four. Storage facilities are reduced and quality control is increased by having a single manufacturer supply all additives in the single admixture of the present invention which eliminates the problem of storage tank contamination. Another advantage of the aqueous admixture of the present invention is that it eliminates fine particle dust at the job site.

The ability of the aqueous admixture of the present invention to impart increased sulfate resistance and increased resistance to alkali-silica reaction in concrete containing it, will be realized from the beneficial effects of silica fume added to the concrete mixture.

Since the aqueous flowable admixture of the present invention may be used in conditions which may lengthen setting time to an objectionable degree, accelerating ingredients may be added to the admixture to provide optimum setting and early strength gain characteristics. Further, it may be desirable to retard the setting time of the fresh concrete as for example in a bridge deck so that hardening takes place after the placing and finishing operations are completed.

The aqueous flowable admixture of the present invention is tailor made with optimum ingredients and amounts of ingredients for the concrete to be used in the construction job at hand. Any of the known ingredients conventionally used in concrete or mortar may be incorporated into the admixture of the present invention.

Accelerators such as the known calcium chloride, calcium nitrate and calcium formate may be incorporated into the admixture with the essential ingredients in amounts that are currently used in the industry as determined by standard tests for optimum quantity for the application at hand. One or more accelerators will comprise from about 5% to about 20% by weight based on the weight of silica fume in the admixture.

Retarders such as sugar in the form of glucose or sucrose conventionally used in concrete or mortar batches may also be incorporated in the admixture in optimum amounts as determined by standard testing. One or more retarders may be present in an amount of from about 5% to about 20% by weight based on the weight of silica fume in the admixture.

If desired, air entraining agents such as Vinsol resin or Darex which is a sulfonated fatty acid derived from fats and greases may be incorporated into the admixture of the present invention in those particular applications where a given level of entrained air may be a desirable characteristic. One or more air entraining agents may be present in an amount of from about 0.5% to about 2% by weight based on the weight of silica fume.

Any one or more additives alone or in combination with other additives may be incorporated with the essential ingredients in the admixture of the present invention. Compatibility and consistency of the aqueous flowable admixture is determined by routine standard testing as well as the final effect on the particular concrete or mortar batch to be used in the construction job at hand.

The admixture of the present invention may contain various proportions of selected ingredients but in order to realize the benefit of the present invention, the amount of admixture mixed into a conventional fresh concrete batch will be sufficient to provide from about 2.0% to about 100% by weight of silica fume based on the weight of cement and from about 0.1% to about 5% by weight of one or more concrete water-reducing agents alone or in combination based on the weight of cement. Water or an organic liquid compatible with fresh concrete is added to the silica fume-water reducer admixture in an amount sufficient to provide a slurry with the essential ingredients uniformly and homogeneously dispersed therein having the specified gel strength yield point. Accelerators, retarders, air entraining agents and any other conventional ingredients may be mixed with the essential ingredients of the admixture of the present invention in an amount sufficient to provide the desired concentration in the fresh concrete batch. In all cases the optimum amount of ingredients present in the admixture of the present invention is determined by standard conventional testing under the simulated ambient conditions for the job materials at hand and construction procedures to be used.

It will be understood that it is intended to cover all changes and modifications of the preferred embodiment of the invention herein chosen for the purpose of illustration which do not constitute a departure from the spirit and scope of the invention.

What is claimed is:

1. A non curing, stabilized aqueous dispersion consisting essentially of from 10 to 80% by weight silica fume obtained as a by-product of a silicon metal or ferrosilicon alloy production, said fume having at least about 60% by weight silicon dioxide; from 0.1 to 10% stabilizing agents based on the weight of said silica fume in the aqueous dispersion, said stabilizing agent selected from the group consisting of lignosulfonic acid and their salts and modifications and derivatives thereof, melamine derivatives, naphthalene derivatives, and hydroxylated carboxylic acid and their salts; and at least 15% water, said non curing, stabilized dispersion being stable against gelling.

2. The dispersion of claim 1 wherein the aqueous dispersion contains about 40 to 60% by weight silical fume.

3. The dispersion of claim 1 wherein the silica fume is obtained from a 75% ferrosilicon alloy production.

* * * * *

UNITED STATES PATENT AND TRADEMARK OFFICE
CERTIFICATE OF CORRECTION

PATENT NO. : 5,843,216
DATED : December 1, 1998
INVENTOR(S) : Magne Dåstøl

It is certified that error appears in the above-indentified patent and that said Letters Patent is hereby corrected as shown below:

Title page item [62], first line, change "abandoned" to --now U.S. Pat. 5,472,501 dated Dec. 5, 1995--.

Column 1, line 8, change "abandoned" to --U.S. Pat. 5,472,501 dated Dec. 5, 1995--.

Column 3, line 30, change "Mgo" to --MgO--.

Column 4, line 29, after "fineness" insert --and--.

Column 5, line 16, delete "20"; line 62, change "increased" to --increasing--.

Column 10, line 62, after "to" insert --about--; change "silical" to --silica--.

Signed and Sealed this

Second Day of March, 1999

Attest:

Attesting Officer

Q. TODD DICKINSON

Acting Commissioner of Patents and Trademarks